(12) United States Patent
Zhang et al.

(10) Patent No.: US 12,341,752 B2
(45) Date of Patent: Jun. 24, 2025

(54) HIERARCHICAL SYSTEM FIREWALL AND CONFIGURATION METHOD

(71) Applicant: NANJING SEMIDRIVE TECHNOLOGY CO. LTD., Jiangsu (CN)

(72) Inventors: Lihang Zhang, Shanghai (CN); Mingle Sun, Shanghai (CN); Jun Xie, Shanghai (CN)

( * ) Notice: Subject to any disclaimer, the term of this patent is extended or adjusted under 35 U.S.C. 154(b) by 644 days.

(21) Appl. No.: 17/634,979

(22) PCT Filed: Sep. 17, 2020

(86) PCT No.: PCT/CN2020/115765
§ 371 (c)(1),
(2) Date: Feb. 13, 2022

(87) PCT Pub. No.: WO2021/027976
PCT Pub. Date: Feb. 18, 2021

(65) Prior Publication Data
US 2022/0329568 A1     Oct. 13, 2022

(30) Foreign Application Priority Data
Aug. 13, 2019  (CN) .......................... 201910743535.0

(51) Int. Cl.
*H04L 9/40*         (2022.01)
(52) U.S. Cl.
CPC ...... *H04L 63/0263* (2013.01); *H04L 63/0236* (2013.01); *H04L 63/105* (2013.01); *H04L 63/20* (2013.01)
(58) Field of Classification Search
CPC ............. H04L 63/0263; H04L 63/0236; H04L 63/105; H04L 63/20; H04L 63/0428;
(Continued)

(56) References Cited

U.S. PATENT DOCUMENTS

| 2010/0191863 A1 | 7/2010 | Wing |
| 2011/0078781 A1 | 3/2011 | Chou et al. |

(Continued)

FOREIGN PATENT DOCUMENTS

| CN | 104113522 | 10/2014 |
| CN | 110532789 | 12/2019 |

OTHER PUBLICATIONS

Chen, Ning. "Research of Multi-firewall Based Access Control and Its Applications", China Master's Theses Full-text Database, No. 6., Jun. 30, 2009, pp. 47-50.

*Primary Examiner* — Kambiz Zand
*Assistant Examiner* — Aubrey H Wyszynski
(74) *Attorney, Agent, or Firm* — AGMON LAW PTE LTD

(57) ABSTRACT

A hierarchical system firewall, comprising a root security manager, secondary security managers, a firewall controller, and firewalls. The root security manager designates a secondary security manager and allocates a system resource for each domain cluster, and provides firewall configuration schemes between the domain clusters. The secondary security managers add domain identifiers for hosts and devices of domain clusters, and provides a firewall configuration scheme for each domain. The firewall controller adds domain cluster identifiers for the hosts and devices in the system, and adds identification for the secondary security managers; allocates domain identification for a host and a device of a current domain cluster; and configures access permissions for the firewall of each device in the current domain cluster. The firewalls perform permissions control for access to a current device by hosts from different domains or different domain clusters. Further provided in the present invention is a configuration method for the hierar- (Continued)

chical system firewall, simplifying system design, and improving system security.

11 Claims, 2 Drawing Sheets

(58) Field of Classification Search
CPC . H04L 63/083; H04L 63/0218; G06F 21/604; G06F 2221/2113; G06F 2221/2141
USPC .......................................................... 726/11
See application file for complete search history.

(56) References Cited

U.S. PATENT DOCUMENTS

| | | |
|---|---|---|
| 2011/0162060 A1 | 6/2011 | Vijayakumar et al. |
| 2012/0185930 A1* | 7/2012 | Desai .................. G06F 21/6218 726/13 |
| 2012/0215901 A1* | 8/2012 | Jog ..................... H04L 61/4511 709/223 |
| 2015/0244677 A1* | 8/2015 | Ringen .................. H04L 63/08 726/13 |
| 2019/0104111 A1* | 4/2019 | Cidon ................. H04L 12/1428 |
| 2019/0158605 A1* | 5/2019 | Markuze ............... H04L 69/163 |

* cited by examiner

HIERARCHICAL SYSTEM FIREWALL AND CONFIGURATION METHOD

TECHNICAL FIELD

The examples of the present invention relate to the technical field of systems on chip (SoC), in particular to a firewall of a SoC.

BACKGROUND ART

The hardware firewall in a SoC mainly has the following functions:
Providing reliable data isolation for each subsystem;
Providing reliable data interaction channels among the subsystems and between the host and the devices in each subsystem;
Protecting the sensitive information of the secure world;
Providing a secure data interaction channel between the secure world and the non-secure world.

Most existing hardware firewall designs employ a single-hierarchy management structure, that is, a single manager manages the security policies of the entire system. As the number of subsystems in the system continually increases, the design complexity of the structural security policies of a single-manager increases dramatically, so as to meet different security requirements of each subsystem.

Contents of the Invention

In order to overcome the drawbacks in the prior art, the present invention provides a hierarchical system firewall and a configuration method, which simplify functional design of system security application and improve the security of the entire system and the subsystems.

To attain the above object, at least one example of the present invention provides a hierarchical system firewall, which comprises a root security manager, second-level security managers, a firewall controller, and a firewall, wherein,
the root security manager designates a second-level security manager and assigns system resources for each domain cluster; and provides a firewall configuration scheme between the domain clusters;
the second-level security manager assigns domain identifiers to the host and devices of the domain cluster and provides a firewall configuration scheme for each domain in the domain cluster;
the firewall controller assigns domain cluster identification index to the hosts and the devices in the system, and assigns identification to the second-level security managers; assigns domain identification to the hosts and the devices in the current domain cluster; and configures access permissions for the firewall of each device in the current domain cluster;
the firewall controls the permissions of the hosts in different domains or different domain clusters to access the current device.

Furthermore, the system resources include hosts, devices and domain resources.

Furthermore, the hierarchical system firewall further comprises domain identification generators, which generate a domain cluster identification for each host in the system according to the configuration of the root security manager; and generate a domain identification for each host in the system according to the configuration of the root security manager and the second-level security managers.

Furthermore, the firewall controller assigns domain cluster identifications to the hosts and devices in the system and assigns identifications to the second-level security managers according to the configuration of the root security manager; accepts the configuration of the root security manager or the second-level security managers, and assigns domain identifications to the hosts and devices in the current domain cluster; accepts the configuration of the root security manager or the second-level security managers, and configures access permissions for the firewall of each device in the current domain cluster.

Furthermore, the firewall controls the access permissions of the hosts in different domains or different domain clusters to access the current device according to the configuration of the root security manager or the second-level security manager of the current domain cluster.

To attain the above object, at least one example of the present invention further provides a configuration method of a hierarchical system firewall, which comprises the following steps:
1) assigning system resources and designating a second-level security manager for each domain cluster;
2) assigning domain cluster identification index to the hosts and devices in the system, assigning identifications to the second-level security managers, and providing a firewall configuration scheme among the domain clusters;
3) assigning domain identifications to the hosts and devices in each domain cluster and then assigning the hosts and devices to different domains, and providing a firewall configuration scheme for each domain:
4) configuring access permissions for the firewall of each device in the current domain cluster:
5) controlling the permissions of the hosts in different domains or different domain clusters to access the current device.

Furthermore, the step 1) further comprises:
the root security manager 10 assigning hosts, devices, and domain resources to each domain cluster, and designating a second-level security manager for each domain cluster.

Furthermore, the step 2) further comprises:
the firewall controller assigning domain cluster identifications to the hosts and devices in the system and assigning identifications to the second-level security managers, according to the configuration of the root security manager;
the root security manager providing a firewall configuration scheme among the domain clusters.

Furthermore, the step 3) further comprises:
the firewall controller accepting the configuration of the root security manager or the second-level security managers, and assigning domain identifications to the hosts and devices in the current domain cluster;
the second-level security manager assigning domain identifiers to all hosts and devices in the domain cluster, and providing a firewall configuration scheme for each domain, according to its own security requirements.

Furthermore, the step 4) further comprises: the firewall controller accepting the configuration of the root security manager or the second-level security managers, and configuring access permissions for the firewall of each device in the current domain cluster.

Furthermore, the step 5) further comprises: the firewall controlling the permissions of the hosts in different domains or different domain clusters to access the current device, according to the configuration of the root security manager or the second-level security managers.

To attain the above object, at least one example of the present invention provides a computer readable storage medium having a program stored thereon, wherein the program can be executed by a processor to perform the steps of the above-mentioned configuration method of a hierarchical system firewall.

The hierarchical system firewall and the configuration method provided by the present invention solve the problem that the design complexity of security policy for a multi-subsystem processor is rapidly increased due to the increased number of subsystems. Compared with the prior art, the present invention has the following technical effects:
1) It simplifies functional design of security application in systems (especially heterogeneous systems with virtualization);
2) It decreases the coupling of security policy management among different subsystems, so that a security application can be developed separately for each subsystem;
3) The hierarchical design reduces the interference among the subsystems and improves the security of the entire system and the subsystems.

Other features and advantages of the present invention will be detailed in the following description and become obvious partially from the description, or will be understood through implementation of the present invention.

DESCRIPTION OF DRAWINGS

The accompanying drawings are provided to help further understanding of the present invention, and constitute a part of the description. These drawings are used in conjunction with the content of the present invention and the examples to interpret the present invention, but don't constitute any limitation to the present invention. In the figures.

EMBODIMENTS

Hereunder preferred examples of the present invention will be described, with reference to the accompanying drawings. It should be understood that the examples described here are only provided to describe and interpret the present invention, but don't constitute any limitation to the present invention.

The steps shown in the flow charts in the accompanying drawings may be executed in a computer system, for example, by means of a set of computer executable instructions. Moreover, although a logic sequence is shown in the flow charts, the illustrated or described steps may be executed in a sequence different from the sequence illustrated here, under some circumstances.

In at least one example of the present invention, management of access permissions is based on domains and domain clusters, wherein:

A domain is a space of access rules in the system. All hosts and devices assigned to the space follow the same access rules. The rules of the space can only be controlled by the manager in the space or a superior manager, not controlled by other domain managers.

A domain cluster is a set of multiple access rule spaces in the system. All hosts and devices assigned to the space can be assigned to the domain spaces in the domain cluster by a domain cluster manager.

Example 1

Figure 1:
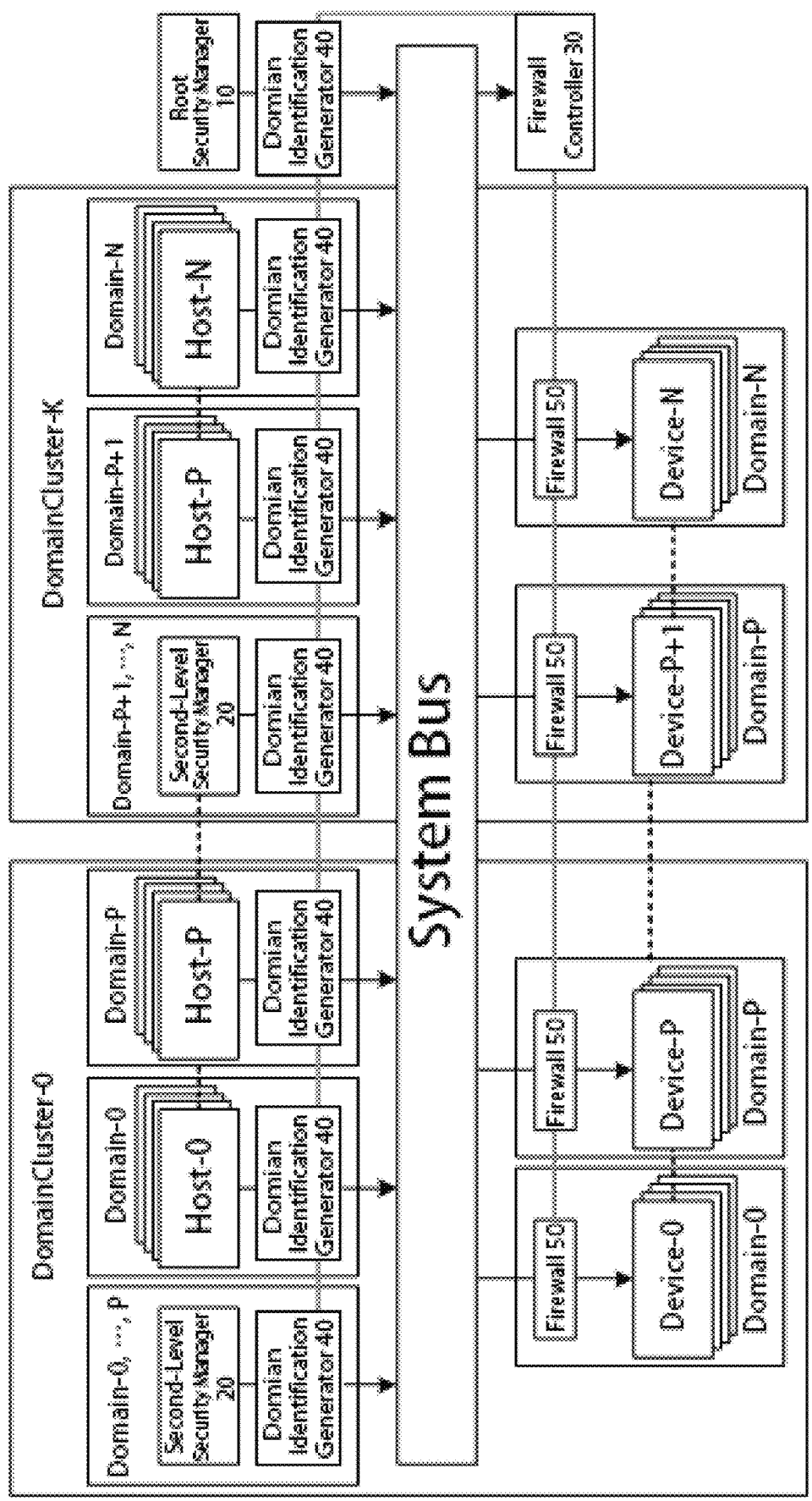
FIG. 1 is a structural block diagram of hierarchical system firewall according to the present invention.

FIG. 1 is a structural block diagram of the hierarchical system firewall according to the present invention. As shown in FIG. 1, the hierarchical system firewall of the present invention comprises a root security manager 10, second-level security managers 20, a firewall controller 30, domain identification generators 40, and a plurality of firewalls 50, wherein, the root security manager 10 designates a second-level security manger 20 and assigns hosts (Master), devices (Slave) and domain resources to each domain cluster; and provides an initial firewall configuration scheme (e.g., complete isolation) among the domain clusters.

In an example of the present invention, the root security manager 10 assigns system resources (including hosts, devices and domain resources) to different domain clusters according to the application requirements, and provides a complete-isolation firewall configuration scheme among the domain clusters.

The second-level security manager 20 assigns domain identifiers to all hosts and devices in the domain cluster to which the second-level security manager 20 belongs, and provides a firewall configuration scheme for each domain in the domain cluster. The firewall configuration scheme configures the permissions of the hosts in different domains in the current domain cluster to access the devices in a specified domain.

In an example of the present invention, the second-level security manager 20 assigns the host and device resources in the domain cluster, to which the second-level security manager 20 belongs, to different domains and provides a firewall configuration scheme for each domain in the current domain cluster, according to its own security requirements.

The firewall controller (FWC) 30 assigns domain cluster identification index to the hosts and devices in the system, and assigns identifications to the second-level security managers, assigns domain identifications to the hosts and devices in the current domain cluster; and configures access permissions for the firewall of each device in the current domain cluster, including:
1) setting different access permissions of different domain clusters and different domains in the domain cluster to the current device;
2) The types of access permissions may be slightly different in different systems, mainly including:
whether to permit read access;
whether to permit write access;
whether to permit secure read access;
whether to permit secure write access;
whether to permit read access in a privileged mode;
whether to permit write access in a privileged mode.

In an example of the present invention, in the initial state, the firewall controller 30 assigns domain cluster identification number to the hosts and devices in the system and assigns and identifications to the second-level security managers, according to the configuration of the root security manager 10; after the configuration of the root security manager 10 is finished, the firewall controller 30 accepts the configuration of the root security manager 10 or the second-level security managers 20, and assigns domain identifications to the hosts and devices in the current domain cluster;

and accepts the configuration of the root security manager 10 or the second-level security managers 20, and configures access permissions for the firewall of each device in the current domain cluster.

The configuration of the access permissions may be based on the domain cluster identifier or domain identifier of the currently accessing hosts, the read/write type of the access, and whether the access is secure or in a privileged mode, etc.

The domain identification generators (DIDA) 40 generate a domain cluster identification and a domain identification for each host in the system.

In an example of the present invention, the domain identification generators 40 generate domain cluster identifications for each of the hosts and devices in the system according to the configuration of the root security manager 10; and generate a domain identification for each host in the system according to the configuration of the root security manager 10 and the second-level security managers 20.

The firewall 50 controls the access permissions of the hosts in different domains or different domain clusters to the current device. The access permissions may be controlled on the basis of the domain cluster identifier or domain identifier of the currently accessing host, the read/write type of the access, and whether the access is secure or in a privileged mode, etc.

In an example of the present invention, the firewall 50 controls the permissions of the hosts in different domains or different domain clusters to access the current device, according to the configuration of the root security manager 10 or the second-level security managers 20.

Example 2

Figure 2:
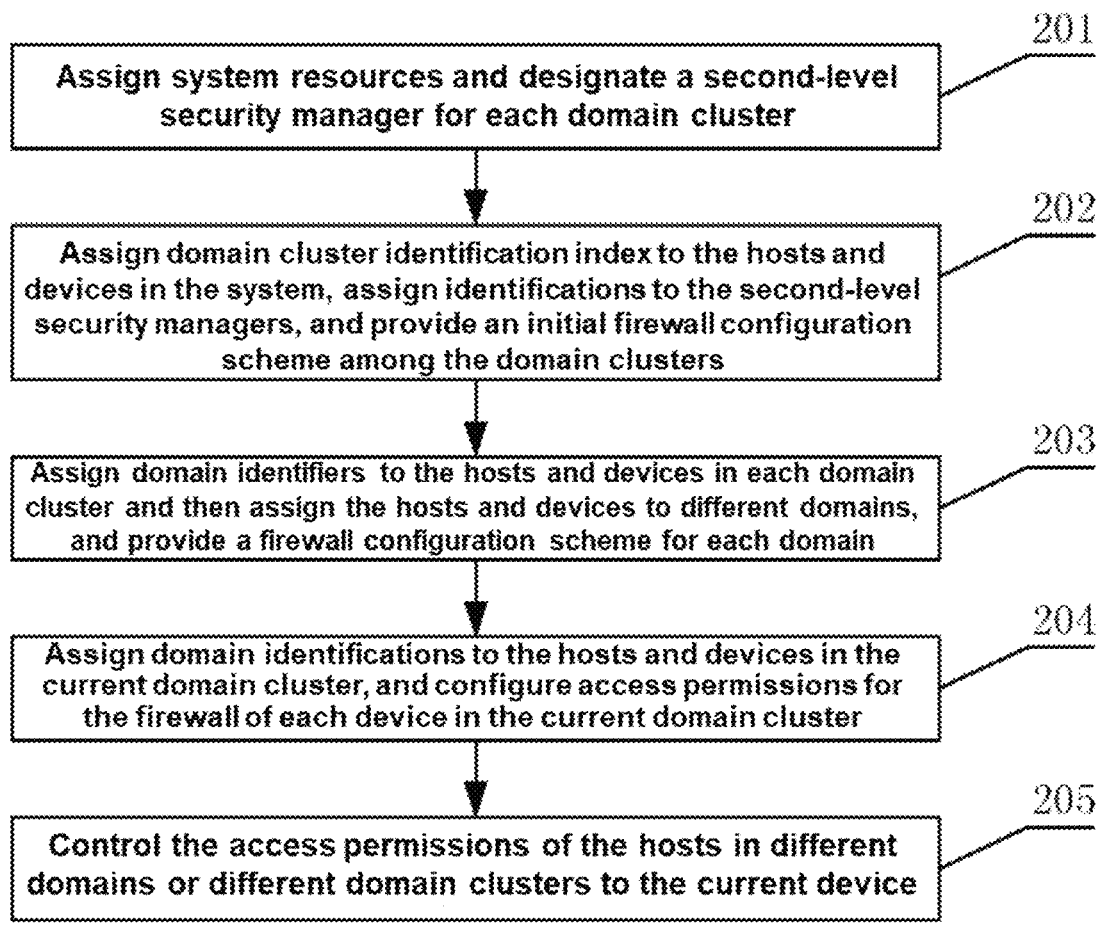
FIG. 2 is a flow chart of the configuration method of the hierarchical system firewall according to the present invention.

FIG. 2 is a flow chart of configuration method of the hierarchical system firewall according to the present invention. Hereunder the configuration method of the hierarchical system firewall in the present invention will be described in detail with reference to FIG. 2.

First, at step 201, the system resources are assigned to each domain cluster and a second-level security manager is designated for each domain cluster.

In an example of the present invention, the root security manager 10 assigns hosts, devices, and domain resources to each domain cluster, and designates a second-level security manager 20 for each domain cluster.

At step 202, domain cluster identification indexes are assigned to the hosts and devices in the system, identifications are assigned to the second-level security managers, and an initial firewall configuration scheme among the domain clusters is provided.

In an example of the present invention, the firewall controller 30 assigns domain cluster identifications to each of the hosts and devices in the system and assigns identifications to the second-level security managers, according to the configuration of the root security manager 10; the root security manager 10 provides a complete-isolation firewall configuration scheme among the domain clusters.

At step 203, after domain identifiers are assigned to the hosts and devices in each domain cluster, the hosts and devices are assigned to different domains, and a firewall configuration scheme is provided for each domain.

In an example of the present invention, the firewall controller 30 accepts the configuration of the root security manager 10 or the second-level security managers 20, and assigns domain identifications to the hosts and devices in the current domain cluster; the second-level security manager 20 assigns domain identifiers to all hosts and devices in the domain cluster, and provides a firewall configuration scheme for each domain, according to its own security requirements.

At step 204, access permissions are configured for the firewall of each device in the current domain cluster.

In an example of the present invention, the firewall controller 30 accepts the configuration of the root security manager 10 or the second-level security managers 20, and configures access permissions for the firewall of each device in the current domain cluster.

At step 205, the access permissions of the hosts in different domains or different domain clusters to the current device are controlled.

In an example of the present invention, the firewall 50 controls the access permissions of the hosts in different domains or different domain clusters to the current device, according to the configuration of the root security manager 10 or the second-level security managers 20. The access permissions may be controlled on the basis of the domain cluster identifier or domain identifier of the currently accessing host, the read/write type of the access, and whether the access is secure or in a privileged mode, etc.

An example of the present invention provides a computer readable storage medium having a program stored thereon, wherein the program can be executed by a processor to perform the steps of the configuration method of the hierarchical system firewall described in any example.

The computer readable storage medium may include: U-disk, Read-Only Memory (ROM), Random Access Memory (RAM), removable hard disk, diskette, or optical disk, or other medium that can store program codes.

Application Examples

Hereunder the examples of the present invention will be described in detail in an application example, in which two operating systems run in the system. The application example is taken as example to state the present invention. However, the application example is not used to limit the scope of protection of the present invention. For example, the hierarchical system firewall provided by the present invention is also applicable to systems in which multiple operating systems run.

In an application example of the present invention, two operating systems, OS_A (e.g., Android system) and OS_B (e.g., Free RTOS), nm in a virtualized system at the same time:

In the process of initialization, the root security manager (e.g., the first-level boot processor) assigns the system resources, including hosts, devices and domain resources, to two domain clusters, DomainGroup_A (for OS_A) and DomainGroup_B (for OS_B), according to the application requirements, and designates second-level security managers (e.g., the boot processors CPU_A and CPU_B of the two operating systems) for the two domain clusters.

After the initialization is finished and the operating systems are started respectively, the second-level security manager (boot processor) of each operating system assigns the host and device resources in the corresponding domain cluster to different domains according to its own security requirements, and configures access policies for the firewalls of devices that belong to different domains.

After configuration is finished, the configuration of the system domains, hosts, devices and access policies is shown in Table 1. In the table, R/W represents that read and write access is permitted; R represents that only read access is permitted; W represents that only write access is permitted; SR/SW represents that secure read and write access is permitted; SR represents that only secure read access is permitted; SW represents that only secure write access is permitted; "-" means neither read access nor write access is permitted. In this example, only a few of common access policies are listed.

TABLE 1

| | | | Domain Cluster | | | | | | |
|---|---|---|---|---|---|---|---|---|---|
| | | | DomainCluster_A (Android) | | | | DomainCluster_B (FreeRTOS) | | |
| | | | | Face | | | | | |
| No. | Device | Host Domain No. | CPU_A 0 | CMOS sensor 1 | recognition unit 2 | Display controller 0 | CPU_B 8 | Encryption engine 9 | Ethernet controller 10 |
| DomainCluster_A | Memory 0 | 0 | R/W | R/W | R/W | R/W | — | — | — |
| | Memory 1 | 1 | SR/SW | — | — | SR | — | — | — |
| | Memory 2 | 2 | — | W | R | — | — | — | — |
| DomainCluster_B | Memory 3 | 8 | — | — | — | — | R/W | R/W | R/W |
| | Memory 4 | 9 | — | — | — | — | SW | R/W | — |
| | Memory 5 | 10 | | | | | | W | R |

According to the configuration, the Android system and the FreeRTOS system are completely isolated from each other, that is to say, the hosts in either system can't access the devices in the other system.

1. In the Android System
   1) The domain 0 is an ordinary non-secure domain;
   2) The Domain 1 is a secure domain, in which for example a password keyboard application may run. CPU_-A draws a disordered password keyboard in memory unit 1 through secure access, and the display controller securely reads out and displays the password keyboard in the memory 1 through secure access. The password entered by the user can be protected because none of the other hosts in the system can access the content of the password keyboard,
   3) The Domain 2 is another secure domain. This domain is used for a face unlocking application. In the initial state, the user inputs the face images into the memory 2 by means of a CMOS sensor module; after face recognition is started, the face recognition module reads the face data written in the memory 0 by the CMOS sensor module and compares it with the face feature data stored in the memory 2 to judge whether to unlock or not. The security of the face feature data is ensured since only the face recognition unit can read the face feature data in the memory 2.
2. In the FreeRTOS System
   1) The domain 8 is an ordinary non-secure domain;
   2) The Domain 9 is a secure domain, in which CPU_B writes plaintext into memory 4 through secure access in an encrypted communication application; the encryption engine reads out the plaintext in the memory 4, encrypts it to generate ciphertext, and then stores the ciphertext in memory 5; the Ethernet controller reads out the ciphertext from the memory 5 and then transmits it;
   3) In that process, the information security of the plaintext is ensured since only the encryption engine can read the plaintext.

Since a hierarchical control structure is employed in the examples of the present invention, each operating system can maintain its own security policies separately, and the development of the security policies of each operating system is simplified; the interaction between each operating system and the root security manager during operation is greatly reduced, thus the design of the root security manager is simplified; the coupling of the security policies of each operating system is greatly decreased, the interference between the operating systems is greatly reduced, and the overall security of the system is improved.

Those skilled in the art should appreciate: the examples described above are only some preferred examples of the present invention, and do not constitute any limitation to the present invention. Though the present invention has been described in detail with reference to the above-mentioned examples, those skilled in the art can easily make modifications to the technical scheme recorded in the above mentioned examples or make equivalent replacement for some technical features therein. Any modification, equivalent replacement, or improvement made without departing from the spirit and principle of the present invention shall be deemed as falling into the scope of protection of the present invention.

The invention claimed is:
1. A System-on-a-Chip (SoC) comprising:
   computing resources configured to implement a root security manager, the computing resources comprising at least a first processor and a second processor;
   system resources comprising hosts and devices, each of the devices having a firewall;
   a virtualized first domain cluster comprising a plurality of first domains, a virtualized second domain cluster comprising a plurality of second domains;
   the root security manager configured to:
      assign the first processor to the first domain cluster to implement a first second-level security manager and the second processor to the second domain cluster to implement a second second-level security manager;
      assign system resources to the first domain cluster and the second domain cluster; and
      provide a domain cluster firewall configuration scheme between the first domain cluster and the second domain cluster;
   the first second-level security manager and the second second-level security manager each configured to:
      assign domain identifiers to each of the hosts and devices assigned to the first domain cluster and the second domain cluster respectively; and
      provide a domain firewall configuration scheme for each of the first domains and second domains respectively;

a firewall controller implemented by the computing resources; the firewall controller configured to:
assign a domain cluster identification index to each of the hosts and the devices;
assign identifications to each of the first second-level security manager and the second second-level security manager;
assign domain identifications to the hosts and devices; and
configure firewall access permissions for each of the firewalls.

2. The SoC according to claim 1, wherein the system resources further comprise domain resources.

3. The SoC according to claim 1, further comprising a domain identification generator, configured to generate domain cluster identification for the hosts according to a configuration of the root security manager; and to generate domain identification for the hosts according to the configuration of the root security manager and a configuration of the first second-level security manager and/or the second second-level security manager.

4. The SoC according to claim 3, wherein the firewall controller is further configured to
assign a domain cluster identification index to the hosts and the devices; and
assign identifications to each of the first second-level security manager and the second second-level security manager according to the configuration of the root security manager;
after the identifications have been assigned to the first second-level security manager and the second second-level security manager, accept the configuration of the root security manager or a configuration of the first second-level security manager and the second second-level security manager; and
after the domain identifiers have been assigned to the hosts and the devices, accept the configuration of the root security manager or the first second-level security manager and the second second-level security manager.

5. The SoC according to claim 1, wherein each firewall is configured to control host access permissions across each of the first domains and the second domains and/or first domain cluster and/or second domain cluster.

6. A method of configuring a system on a Chip (SoC), the method comprising the steps of:
1) assigning a first processor and a second processor configured to implement a first second-level security manager and a second second-level security manager along with system resources to a virtualized first domain cluster and a second virtualized second domain cluster respectively, the system resources comprising hosts and devices;
2) assigning a domain cluster identification index to the hosts and the devices, assigning identifications to the second-level security manager, and providing a domain cluster firewall configuration scheme for the first domain cluster and the second domain cluster;
3) assigning domain identifiers to the hosts and devices in the first domain cluster and the second domain cluster before assigning the hosts and devices to domains within the first domain cluster and the second domain cluster, and providing a domain firewall configuration scheme for each domain;
4) configuring access permissions for a firewall of each of the devices;
5) controlling access permissions of the hosts across the domains or the first domain cluster and the second domain cluster.

7. The method according to claim 6, wherein the step 1) is performed by a root security manager implemented by computing resources.

8. The method according to claim 7, wherein the step 2) further comprises assigning domain cluster identifications for each of the hosts and the devices in the system and assigning identifications for the second-level security managers, according to a configuration of the root security manager.

9. The method according to claim 8, wherein the step 3) further comprises:
accepting the configuration of the root security manager or the first second-level security manager and the second second-level security manager by a firewall controller;
wherein the domain firewall configuration scheme is provided according to security requirements.

10. The method according to claim 9, wherein the step 4) further comprises accepting the configuration of the root security manager or the first second-level security manager and the second second-level security manager by the firewall controller and configuring firewall access permissions for a firewall for each of the devices.

11. The method according to claim 10, wherein the controlling access permissions of the hosts across the domains or the first domain cluster and the second domain cluster in step 5) is according to the configuration of the root security manager or the first second-level security manager and the second second-level security manager.

* * * * *